United States Patent [19]

Fassbender et al.

[11] Patent Number: 4,752,314
[45] Date of Patent: Jun. 21, 1988

[54] METHOD AND APPARATUS FOR MELTING GLASS BATCH

[75] Inventors: Alexander G. Fassbender, Kennewick; Paul C. Walkup; Lyle K. Mudge, both of Richland, all of Wash.

[73] Assignee: Battelle Development Corporation, Columbus, Ohio

[21] Appl. No.: 70,018

[22] Filed: Jul. 6, 1987

[51] Int. Cl.⁴ .................................................. C03B 5/10
[52] U.S. Cl. .......................................... 65/134; 65/27; 65/335
[58] Field of Search ............................ 65/27, 134, 335

[56] References Cited

U.S. PATENT DOCUMENTS

| | | | |
|---|---|---|---|
| 3,443,921 | 5/1969 | Boivent | 65/134 |
| 4,119,395 | 10/1973 | Hatanaka et al. | 65/27 X |
| 4,135,904 | 1/1979 | Suzuki et al. | 65/27 |
| 4,282,019 | 8/1981 | Dunn et al. | 65/27 |
| 4,374,660 | 2/1983 | Sakhuja et al. | 65/27 X |
| 4,478,627 | 10/1984 | Hohman et al. | 65/27 |
| 4,544,394 | 10/1985 | Hnat | 65/27 |
| 4,617,042 | 10/1986 | Stickler | 65/27 |
| 4,617,046 | 10/1986 | Hals | 65/134 |
| 4,632,687 | 12/1986 | Kunkle et al. | 65/27 |

Primary Examiner—Arthur Kellogg
Attorney, Agent, or Firm—Barry S. Bissell

[57] ABSTRACT

A glass melting system involving preheating, precalcining, and prefluxing of batch materials prior to injection into a glass furnace. The precursors are heated by convection rather than by radiation in present furnaces. Upon injection into the furnace, batch materials are intimately coated with molten flux so as to undergo or at least begin the process of dissolution reaction prior to entering the melt pool.

25 Claims, 3 Drawing Sheets

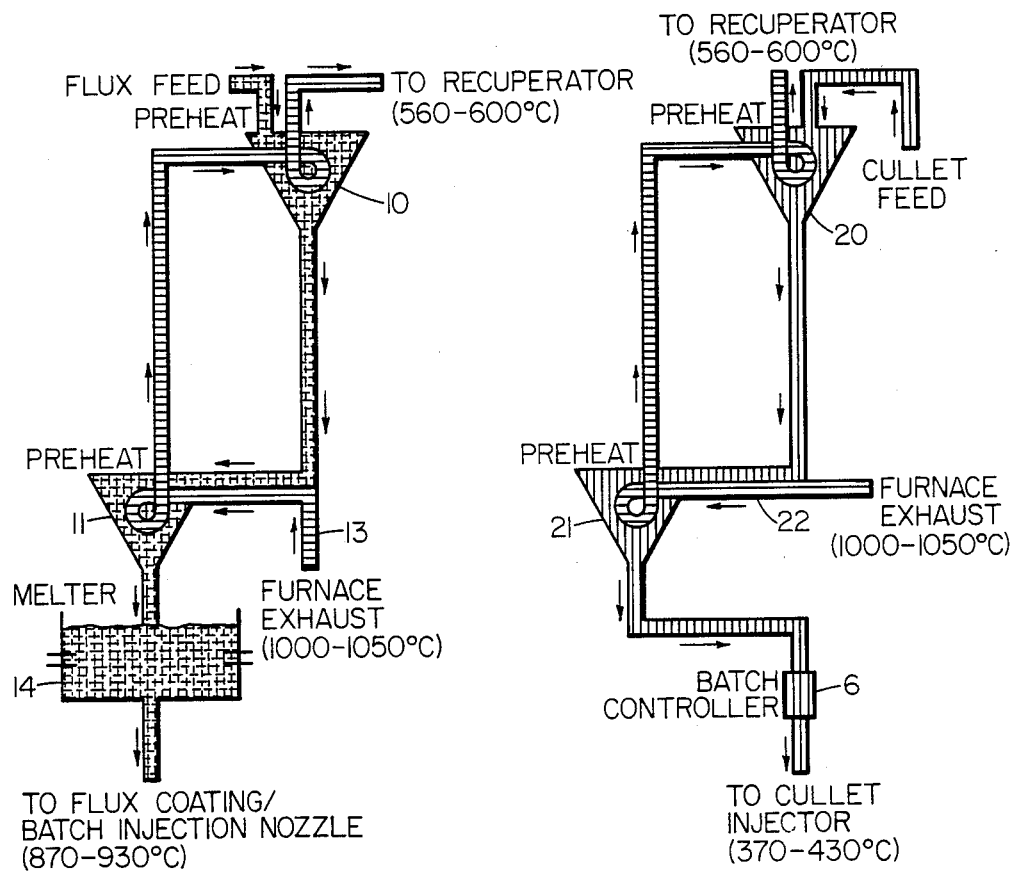
FIG. 2
FIG. 3
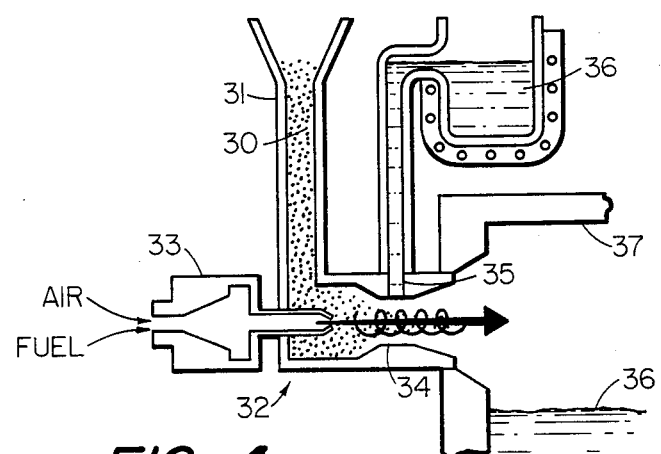
FIG. 4

METHOD AND APPARATUS FOR MELTING GLASS BATCH

TECHNICAL FIELD

Present glass melting technology is typified by large, gas-fired, regenerative furnace systems. Great care is taken with batch precursors to attain the best possible mixing which facilitates the melting and results in melt homogeneity. Carefully prepared glass batch materials are charged to the melting end of the furnace. Unmelted batch typically covers the melt over about two-thirds of the furnace length. Glass batch and melt heating is accomplished by overhead firing within the furnace. The majority of heat transfer occurs by radiation from the flame to the batch and melt. Some radiative heat transfer occurs from the furnace crown to the batch and melt, but the opaqueness and the flame itself may reduce the radiation contribution from that portion of the crown above the flame.

Typically, the glass precursors reside in the melting furnace for an average time of 35 to 35 hours. During this time, the solids undergo reaction and dissolution, and the melt is heated to about 1540° C. Gases (e.g., $CO_2$, $SO_2$, etc.) are produced in the processing and are evolved to form bubbles. These bubbles are removed during the extended "refining" or "plaining" time in the furnace. This refining occurs more toward the refiner in the melter portion of the furnace. Circulation may be induced in the melt to aid the fining process and to achieve melt homogeneity. During this processing, some volatile materials are off-gassed and some portion of dry batch materials are lost due to dusting into the turbulent combustion gases.

The current glass melting technology depends primarily upon radiative heat transfer which makes glass production a fairly inefficient user of energy. In a typical glass melting tank, radiation to the melt occurs from the furnace crown at about 1500° C. and from the flame itself which varies from 1900° C. to an estimated 2400° C., based on the combustion air preheat temperature which varies constantly from the regenerators. Radiative heat transfer is at a maximum when the batch enters "cold." The rate of heat transfer falls off continuously as the differences in temperature between the batch, melt, crown and flame decrease. Thus, the transfer becomes relatively low as the melt approaches refining temperatures above 1100° C. At this time, large quantities of fuel are required for small increases in temperature and the extended heating time results in greater heat losses.

SUMMARY OF THE INVENTION

It is an object of the invention to provide a process and apparatus for reducing the energy requirements for producing glass.

It is an object to reduce the energy requirements by designing a system to rely less on radiation and more on convective heat transfer.

It is a further object to provide shorter heating and refining times, lower flame temperatures and smaller glass furnaces as additional benefits of the lower energy process.

In particular, it is an object to provide for pre-treating of solid and gaseous reactants prior to entry into the furnace.

Finally, it is a primary object to begin the dissolution of the high-melting temperature refractory precursors prior to entry into the melt.

In accordance with the objectives, the present glass production process in its broadest sense involves separating the refractory and flux precursor materials, preheating the refractory materials, melting the flux materials, coating the preheated refractory materials with the flux melt and introducing the coated refractory materials into the glass melting furnace.

The mixing of flux melt and preheated refractory material typically takes place in a gas-fired eductor. Combustion gases are used to convey the solid refractory particles through a venturi nozzle wherein molten flux is metered in to mix with and to coat the solids. The coated particles are then conveyed by the combustion gases to the glass furnace at a temperature below, substantially equal to or above the temperature of the glass in the furnace.

The flux and refractory materials are typically preheated using a combination of furnace exhuast gas and fresh combustion gases. In the inventive process, cullet may also be preheated using exhaust gases and added to the furnace directLy or to the refractory materials downstream of the flux/refractory mixing area.

BRIEF DESCRIPTION OF THE FIGURES

FIG. 2 is a schematic flow diagram of the preheat and melting subsystems for the flux materials in the present process.

FIG. 3 is a schematic flow diagram of an optional subsystem for preheating cullet material in the present process.

FIG. 4 is a schematic diagram of the flux coating-/batch injection subsystem of the present process.

DESCRIPTION OF THE PREFERRED EMBODIMENTS

The inventive glass melting system involves preheating, precalcining, and prefluxing of batch materials prior to injection into the glass furnace. In this way the materials are heated more efficiently by convection rather than by radiation in conventional furnace operation. Upon injection into the furnace, batch materials are coated with molten flux and have undergone, or are in the process of, dissolution reactions.

The glass batch raw materials are divided into two, or optionally, three streams for pyroprocessing: (1) very high melting point refractory materials, (2) lower melting point flux materials, and optionally, (3) glass cullet, which may soften at about 400° C. or higher. This separation is necessary to allow very high temperature (1450° C. to 1550° C.) preheating of the majority of batch materials in a cascaded, cyclone preheating system. Materials which may melt during this preheating must be kept out of this high temperature stream to prevent agglomeration and fouling of the cyclones.

Figure 1:
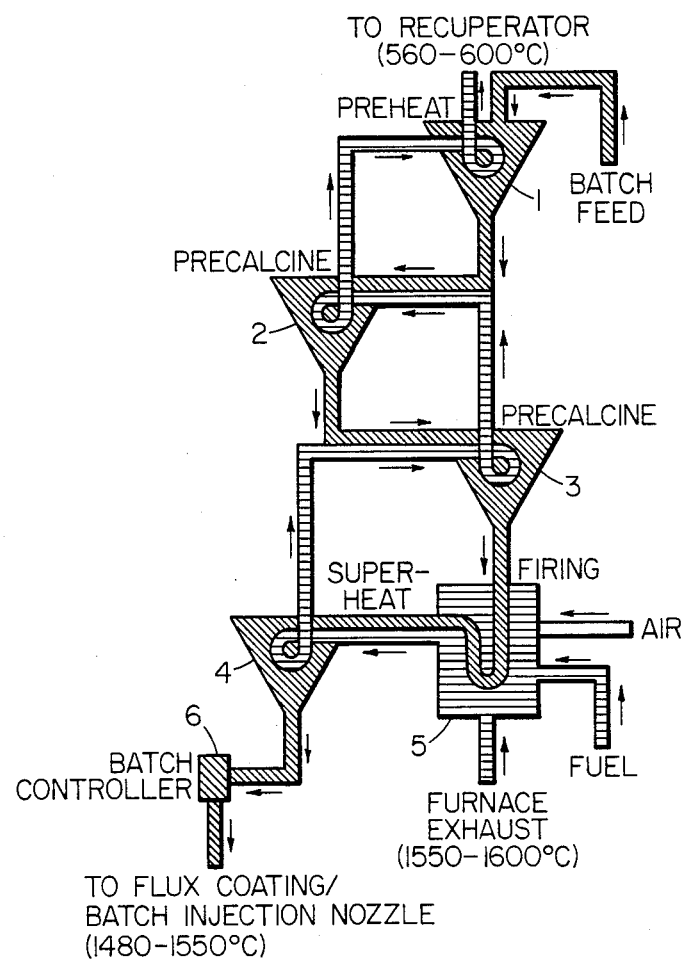
FIG. 1 is a schematic flow diagram of a preheat/precalcine sub-system for the refractory raw materials in the present process.

The high melting point materials (e.g., alumina, silica, limestone, dolomite, etc.) are preheated and precalcined in the subsystem shown in FIG. 1. Preheating of these batch materials occurs primarily by convective heat transfer. This heat transfer is very efficient because of the great surface area of the particulate batch materials and the turbulent scrubbing of these particle surfaces by hot gases. As the raw materials are increased in temperature, they will undergo calcination in which gases will be evolved (e.g., the carbonates will give off $CO_2$, the sulphates will evolve $SO_2$, the hydrates will release HOH, etc.). Evolution of gases before entering the furnace is a significant benefit of the system because these gases will not then be involved in batch foaming or bubble generation in the melt. This allows for a direct reduction in glass refining time.

As shown in FIG. 1, the refractory raw batch is introduced into a cyclone cascade beginning with first cyclone 1, then proceeding to second cyclone 2 and to third cyclone 3. The cyclone cascade will be operated primarily on countercurrent furnace combustion gases which will leave the tank at 1550° or 1600° C. However, additional fuel and air can be reacted in a combustor 5 to make sure the materials are calcined to the desired level. The glass batch materials will increase in temperature very quickly and efficiently as they traverse the cyclones. At the first and second cyclones, preheating and precalcining take place. At the third cyclone stage, raw materials such as limestone and dolomite will undergo calcination. It is estimated that these raw materials will be 80 to 100 percent calcined to CaO and MgO while releasing perhaps 25 to 30 percent of the heat required by the batch. The evolved gases should not cause significant entrainment or pressurization of the system. The calcined products should be dry enough not to form agglomerates or sticky aggregates with the materials present. After calcination in the cyclone and combustor, the batch solids are transported through a fourth cyclone 4 and through a batch controller 6 to the flux coating/batch injection system to be described below.

An off-gas system may be provided to handle the cyclone system pressure drops. The estimated pressure drop through each cyclone is about 1200 Pascals. The cyclones may be of metal construction with refractory lining where necessary.

The preheat system proposed herein allows another advantage over conventionally-fired furnaces. Whereas the combustor 5 shown in FIG. 1 may be simply an oil or gas fired combustor, it could also be replaced for some glass batches by a pulverized coal or heavy oil-fired fluidized bed combustor. The use of coal or heavy oil would greatly reduce fuel costs. For certain glasses coal could have detrimental impurities in terms of color, for example. But for other glasses, such as colored bottle glass, certain coal impurities could be tolerated.

FIG. 2 shows the flux melting subsystem of the invention designed to use furnace exhaust gases at about 1000°–1050° C. to preheat the flux mateirals (e.g., soda ash) in a two stage process. The exhaust gases enter second preheat cyclone 11 through inlet 13 and proceed to first preheat cyclone 10 and on to a recuperator. Flux materials move countercurrent to the gas flow through preheat cyclones 10 and 11, respectively, and then to flux melter 14. The flux is then melted by external power, such as electricity or natural gas, for example. The melt is then conveyed from the melter to the flux coating/batch injection system at about 870°–930° C.

As is the case with the refractory oxide materials, the flux particles should preferably be 1000 U.S. mesh or greater in size. This minimum size specification will minimize flux carryover into the exhaust gas stream. The maximum soda ash particles should preferably be less that 16 mesh size. The upper size limitation is intended to provide good heat transfer characteristics.

The cyclones will be fabricated from a metal or alloy and lined with refractory where conditions require. Using a metal sheel for the cyclones effectively eliminates excess air in-leakage, thereby efficiently heating the flux. Refractory materials will be required to maximize the abrasion and thermal resistance of the cyclone liners.

If cullet is employed in the glass making process it may be preheated using exhaust gases. As shown in FIG. 3, the optional cullet preheat subsystem comprises two cyclones, 20 and 21, utilizing countercurrent furnace exhaust gases entering at 22. The cullet is fed through the cyclones in heat exchange contact with the hot gases to preheat the cullet to as high a temperature as possible without aggromeration. The preheated cullet is then passed through the batch controller 6 to a cullet injector which introduces the cullet into the furnace. Conventional raw material particle size of about 16–1000 U.S. mesh is typical.

The critical flux coating/batch injection subsystem is shown in FIG. 4. The coating/injection subsystem 32 serves to: (1) provide intimate mixing of all batch components, and (2) introduce the preheated, precalcined, prefluxed batch materials into the melting end of the furnace. The preferred coating injector 32 comprises a burner 33, reservoir 31, venturi nozzle 34 and orifice 35 in the venturi for metering of molten flux. The gas-fired combustion products from burner 33 provide additional heat and transport the preheated, precalcined solids 30 from the reservoir 31 to venturi mixing/coating nozzle 34 wherein the molten flux 36 is metered through the orifice 35. Very high mixing and contact efficiency is provided by the mixing/coating nozzle. This, together with the chemical affinity of the materials present, one for the other, will result in very complete coating of the solid particles by the molten flux. Because of the high temperatures involved (e.g., 1500° C. silica, alumina, lime particles, and 870° C. flux melt), verya ggressive dissolution of the solid particles by the flux will commence immediately as the flux coats the solid particles producing a viscous surface layer. It is expected that sufficient thermal energy will be present in the particles and flux and in the hot injectiong ases, to allow completion of dissolution reactions without further addition of heat. The combustion gases from burner 33 finally propel the coated solids into the glass melt 36 in the glass furnace 37. Multiple coating injectors can be used.

The preferred method of adding additional heat at the injector is described above. However, the flux coating-/batch injector subsystem may also be used as a mere mixing device. The temperature may be kept at about 900° C. to coat the refractory particles with flux and inject them into an electric furnace, for example, for further heat addition. The high-sheer contact of the two fluids produces rapid mixing and coating even at the lower temperatures allowing the use of the small injector device. Other larger devices, like cyclone furnaces of the prior art would have a serious glass buildup problem at these lower temperatures.

The nozzle contact/mixing device is essential to the invention as it provides the high-sheer mixing and coating. By nozzle structure, we intend to include the usual venturi nozzle device having a constricted throat section in which melt (or particulate) is aspirated by particulate-laden (or melt-laden) gas. However, we also intend to cover a straight-walled nozzle and an intersecting orifice for aspirating the melt or particulate without the throat section. The primary fluid velocity is, of course, not elevated in the latter straight-walled nozzle. But it does provide reasonably high-sheer mixing and coating. The classic venturi nozzle with a throat section is preferred because of the higher sheer action.

The venturi nozzle shown in FIG. 4 is so-called dry throat venturi wherein the solids and gases are used to aspirate the molten flux in the throat. Other nozzle structures may be used to coat the solid particles with flux. For example, a so-called wet venturi is useful wherein the molten flux is atomized by the combustion gases and fluidized solid batch material is aspirated and coated in the throat with the flux-laden combustion gases.

Figure 5:
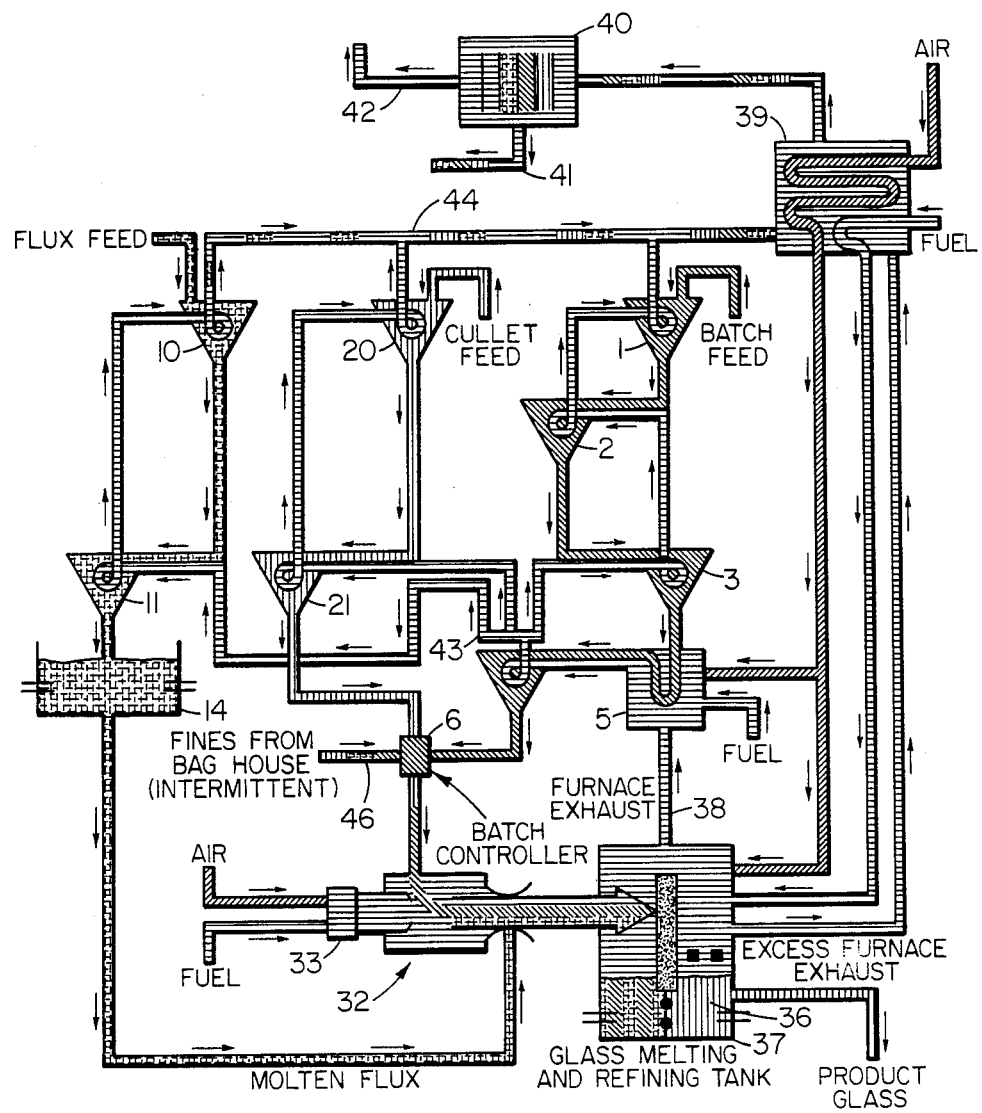
FIG. 5 is a combination schematic diagram of the entire process for producing glass according to one embodiment of the invention.

One embodiment of the combined process and apparatus is shown schematically in FIG. 5. A glass furnace 37 contains molten glass 36 and is fired by conventional means to maintain the temperature of the melt. Exhaust gases leave the furnace at 38 and are directed through combustor 5 and exhaust distributor 43 which conveys the gas to the refractory, cullet, and flux preheat cyclones. Refractory glass batch precursors are preheated and partially calcined by passage through cyclones 1, 2, and 3. Reduction reactions will drive off gases from the raw materials. If possible and practical, these materials should preferably be heated to furnace melt temperatures by additional firing such as in combustor 5 so that little or no melting heat will be required in the glass tank. This will allow for maximum benefit from convective heat transfer outside the glass furnace.

The glass cullet stream is similarly preheated but the exhaust gas in one or two stages through cyclones 20, 21 to near its softening point.

The lower melting point flux materials are preheated using furnace exhaust gases in a separate system of cyclones 10, 11 to as high a temperature as possible without incurring cyclone operating problems. This point is estimated to be near 700° to 760° C. at which point the materials will still be in particulate form. These preheated materials are then to be melted in melter 14 operating at about 870° C. to 930° C.

The spent exhaust gases from the refractory, cullet and flux preheat streams are dumped in line 44 and passed through a recuperator 39 where incoming fuel and combustion air may be preheated. A conventional bag house 40 can be used to separate the particulate fines at 41 from the stack exhaust at 42. Fines may be reintroduced to the raw material injection system through an inlet 46 to the batch controller 6. The preheated, precalcined refractory solids are metered by the batch controller 6 into the coating injector 32 and are picked up and transported by a gas-fired eductor. The combustion products through burner 33 provide additional heat and transport the preheated particles to the preferred venturi mixing/coating nozzle wherein the molten flux is metered in. Very high mixing and contact efficiency is provided by the mixing/coating nozzle resulting in very rapid coating of the solid particles by the molten flux. Some of the particles will be fully dissolved (and molten) before entering the glass tank melt. Other particles will be partially dissolved and will continue to dissolve after joining the melt.

The preheated cullet stream may be introduced intermittently or continuously to the batch injection system, but the cullet will not require flux coating. The cullet may be injected through a coating/mixing nozzle without flux being provided, or the cullet may be injected through a separate injection system employing an eductor only without a flux coating nozzle.

The velocity present in the materials as they pass through the mixing/coating nozzle should be sufficient to carry them into the melting area of the glass tank. Directional placement control should preferably be available here to insure batch materials are injected where desired. The heat content of these two material streams is preferably sufficient for completion of the dissolution reactions. An extra thermal boost may be given the flux-coated and cullet particles by the high temperature combustion gases used to fire the batch eductors. Typically, additional melting heat is not required in the glass tank. Only the heat required to maintain the furnace at temperature for refining purposes will be needed. Of course, these materials could be injected at lower temperature if desired or necessary, in which case final melting energy would need to be provided in the furnace. The oxidation potential may also be adjusted in the mixing/coating nozzle and/or in the glass furnace so that reducing conditions for glass clarity are maintained.

Residence time in the glass furnace will allow melt-completion (as needed) and melt refinement. The time necessary to raise the ambient temperatures and melt the bulk of the batch will be almost insignificant relative to present melting practice. The time required to preheat raw materials through the cyclone cascade is on the order of 1 to 2 minutes. This represents nearly instantaneous heating compared to current batch melting practice. Refining time (clearing of gas bubbles) is also greatly reduced because about one-half of the reactiong ases will have been expelled in the precalcining cyclone stage(s). Some residual quantity of reaction gases will be evolved from completion of the dissolution reactions experienced by the injected batch materials. Of course, adequate refining time will be necessary to insure larger particles are fully dissolved and to insure that adequate mixing of the melt has occurred. After injection of the batch materials, the inventive system does not differ significantly from current glass melting practice. Basic furnace operating principles apply.

The inventive system includes recuperative combustion air preheat through recuperator 39. In contrast to present practice where combustion air is heated above 1100° C. in regenerators, standard metal recuperators can be used because the nearly spent exhaust gases will be only about 600° C. at the recuperator. The lower air preheat temperature of about 400° C. will result in a lower flame temperature, lower furnace crown temperatures and result in less thermal $NO_x$ production as well.

Heat transfer in the inventive system is done primarily by convection. The heat transfer rate remains high even as particle temperature increases because the particles progress from lower to higher temperature gases in the cyclones. Depending on how efficiently the evolved gas is removed during cyclone preheating, the refining time may be reduced by one-third or one-half over normal radiation-dominated processes.

Because convective heat transfer is much quicker in this application than is radiative heat transfer, the time period for heat loss is greatly reduced. In addition, furnace size may be greatly reduced because of shorter melting and refining times. The reduced furnace surface area will directly reduce heat losses to the environment. Whereas glass may typically dwell for days in the present furnaces, a dwell time of less than half may be possible for the inventive process. Other direct benefits are obtainable compared to current glass melting practice including:
- shorter heating, melting and refining times
- smaller melting and refining furnace volumes
- lower flame and crown temperatures
- volatile recycling
- more intimate and complete batch/flux mixing
- elimination of batch carryover Indirect benefits include:
- greater fuel thermal efficiency through reduced furnace system heat losses and more effective heat transfer
- improved combustion stoichiometry control
- less furnace noise
- less $SO_x$ and $NO_x$ production and emission
- less exhaust gas fouling
- greater furnace life expectancy
- potentially lower first-time melting system cost.

We claim:

1. A method for pretreating glass-forming raw materials including particulate refractory materials and lower-melting flux materials comprising
    melting the flux materials,
    transporting the particulate refractory material with a primary gas through a nozzle, and
    delivering the molten flux into the nozzle whereby to provide high-sheer mixing, contact and adherence of the refractory particles with the molten flux.

2. The method of claim 1 which further comprises delivering the refractory material and flux to a molten glass pool in a glass-melting furnace.

3. The method of claim 2 wherein the molten flux is injected into the nozzle under positive pressure.

4. The method of claim 2 wherein the refractory material is transported through a venturi nozzle having a constricted throat section.

5. The method of claim 4 wherein the molten flux is aspirated into the throat section of the venturi nozzle.

6. The method of claim 4 wherein the mixing step further comprises
    heating the primary gas and
    heating the particulate refractory material by contact with the primary gas upstream of the venturi nozzle.

7. The method of claim 6 wherein the primary gas additionally carries the coated, particulate refractory material to the molten glass pool in the glass-melting furnace.

8. The method of claim 6 which further comprises additionally heating the preheated, particulate refractory material with the primary gas up to a temperature substantially equal to the temperature of the molten glass in the glass-melting furnace.

9. The method of claim 2 additionally comprising preheating the particulate refractory materials upstream of the nozzle.

10. The method of claim 9 wherein the preheating of particulate refractory material further comprises
    countercurrently flowing the particulate refractory material and high-temperature exhaust gase from the glas-melting furnace in convective heat exchage relationship to preheat the particulate refractory materials.

11. The method of claim 10 which further comprises countercurrently flowing the particulate refractory material and the high-temperature exhaust gases through a series of cyclone heat exchangers.

12. The method of claim 11 which further comprises supplementing the high-temperature exhaust gases with preheated combustion air from another source.

13. The method of claim 10 which further comprises preheating the flux materials with high-temperature exhaust gases from the glass-melting furnace prior to melting the flux materials.

14. The method of claim 13 which further comprises providing a particulate cullet material,
    preheating the particulate cullet material using high-temperature exhaust gas from the glass-melting furnace, and
    introducing the preheated cullet material into the molten glass in the glass-melting furnace.

15. A method for pretreating glass-forming raw materials including particulate refractory materials and lower-melting flux materials comprising
    melting the flux materials,
    fractionating the molten flux into droplets,
    transporting the flux droplets with a primary gas through a nozzle, and
    introducing the particulate, refractory material into the nozzle whereby to provide high-sheer mixing, contact and adherence of the refractory material with the molten flux.

16. The method of claim 15 which further comprises aspirating the particulate of refractory material into a constricted throat section of a venturi nozzle.

17. The method of claim 16 which further comprises preheating the particulate refractory material before introduction into the nozzle.

18. Apparatus for pretreating glass-forming materials including particulate refractory and lower temperature flux materials comprising
    means for melting the flux materials,
    injector means including a nozzle for mixing the molten flux material with the particulate refractory material to contact the latter with molten flux.

19. The apparatus of claim 18 which further comprises means for delivering the coated, particulate refractory material to a glass-melting furnace.

20. The apparatus of claim 19 wherein the injector means includes a source of primary gas for delivering transporting the particulate refractory material through the nozzle.

21. The apparatus of claim 20 wherein the injector means further includes means for delivering the molten flux into the nozzle under positive pressure.

22. The apparatus of claim 20 wherein the nozzle is a venturi having a constricted throat section and includes means for aspirating the molten flux into the throat section.

23. The apparatus of claim 22 which further comprises means for preheating the particulate refractory material upstream of the nozzle.

24. The apparatus of claim 23 wherein the injector means comprises a burner for producing hot combustion gases for additionally heating the preheated, particulate refractory material and transporting such material through the nozzle.

25. The apparatus of claim 23 wherein the means for preheating comprises a series of convective heat exchangers for countercurrently passing the particulate refractory material and high temperature exhaust gases from the glass melting furnace in heat exchange relationship.

* * * * *